July 5, 1960 R. A. COTTON 2,944,017
FILTER MEDIUM
Filed Dec. 17, 1956 2 Sheets-Sheet 1

*INVENTOR.*
RICHARD A. COTTON
BY
*Kenway, Jenney, Witter & Hildreth*
ATTORNEYS

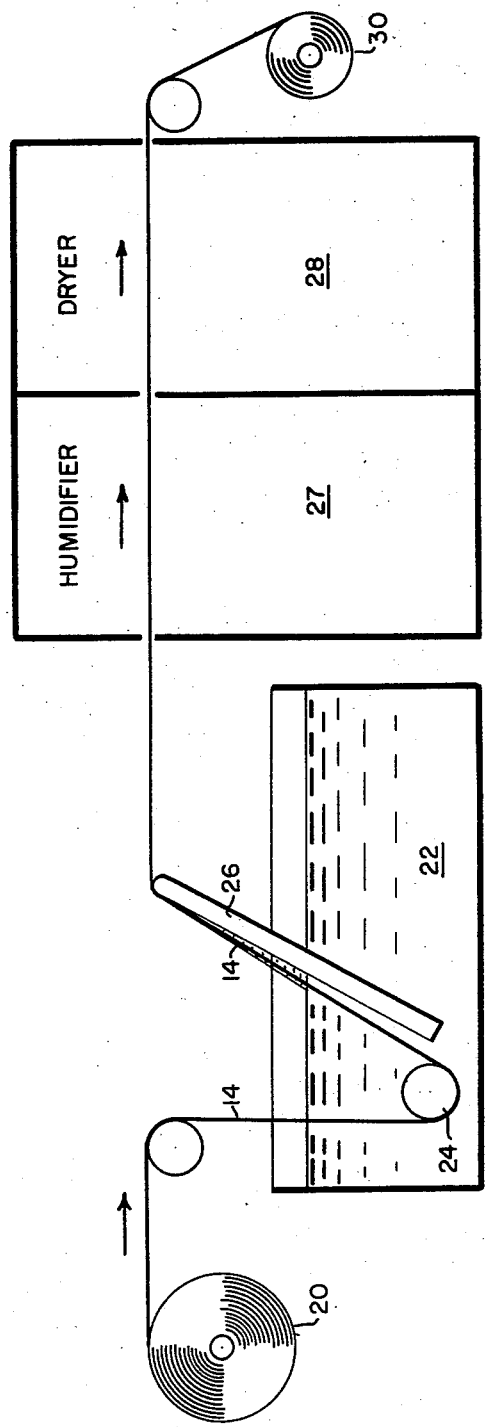

2,944,017
FILTER MEDIUM

Richard A. Cotton, Newton, Mass., assignor to Millipore Filter Corporation, Watertown, Mass., a corporation of Massachusetts Filed Dec. 17, 1956, Ser. No. 628,633

3 Claims. (Cl. 210—500)

This invention consists in a novel filter medium and in a method of making it. An important object is to provide an improved microporous filter of increased strength and durability capable of removing micro-organisms from fluids on a commercial or industrial scale.

A filter medium in sheet form capable of removing micro-organisms in operations on a commercial or industrial scale has long been sought for such uses as the removal of bacteria from pharmaceutical preparations, air filtration and the like. The requisites of such a material include not only an effective pore size of less than a micron, but also a sufficient number of pores to permit filtration at practical rates of flow, and sufficient strength as to be easily handled in large sizes. However, with filter materials heretofore available it has not been possible to provide such small pores in the number necessary for high permeability while maintaining a physical strength adequate for large scale filtration applications, such as continuous filtration.

Materials having suitably small pores in sufficient number to give high permeability are the microporous plastic filter films of the type described by Zsigmondy in U.S. Patent No. 1,421,341; by Grabar, P. and J. A. De Loureiro in Annales de L'Institute Pasture, 65, 159–189 (1939); and by Lovell and Bush in copending application Serial No. 496,618 filed March 24, 1955, now Patent No. 2,783,894.

These materials are microporous plastics having pores of diameter less than five microns in number to occupy at least about 60%, and most commonly from 80–85%, of the total volume of the plastic material. Sheets of these microporous plastic materials are, however, extremely brittle and fragile when the pore volume in high, e.g. over 80% by volume, a fact which has limited them to applications where extreme care may be exercised, such as in bacteriological analysis and other laboratory operations.

Attempts have been made to reinforce microporous plastic film of this type, but with generally poor results when ordinary well-known reinforcing materials are used. The nature of the microporous plastic film, the conditions to which it is subjected during processing, and the peculiar manner in which its unique porosity is imparted during its formation, have been such that it has not been generally possible to form a product which combines the high permeability and the exceedingly small pore diameter of microporous plastic filter films with the strength of a reinforcing material.

It has been found that successful reinforcing of a microporous filter film must meet several conditions which were not at first apparent.

A microporous plastic film of this type attains its porosity during the conversion of a liquid film-forming solution to the final solid sheet form, and in this process the pores become oriented in a direction generally transverse to the plane of the film. Accordingly, the presence of the reinforcing material must neither interfere with the proper development of the pores and must moreover not interfere with their development in a normal transverse direction.

In addition it was found that the reinforcing material must not be such that the distance through the filter, that is, the thickness of the filter film, is unduly large. Otherwise the permeability of the film is low and the film is much more subject to cracking when flexed as a consequence of its inherent brittle and fragile nature.

The reinforcing medium must also not impair the filtering function of the film. Since filtration by means of a film of this type is entirely at the surface, as by a screening effect, the surface characteristics of a reinforced film should be the same as those of the film itself, and this must be achieved without imparting the undue thickness as described in the preceding paragraph. The reinforcing material must accordingly not disrupt the surface and it also must not greatly diminish the high permeability of the filter film.

Suitable reinforcement achieving the objectives hereby sought while avoiding these undesirable effects must also be capable of properly supporting the film, both during its processing from the liquid state to the final solid sheet structure and afterward during its use in filtration. In other words, the interstitial openings in the reinforcing material, which are spanned by filter film material, must be such that the area of film spanning the openings is of effective size for filtration without being so large as to fail in use, by rupturing or cracking. The openings must also not be so large that the reinforcing material fails to provide support of the liquid film during its conversion to the solid film. The openings must however not be so small that the permeability of the reinforced film is greatly reduced nor so small as to interfere with the desired development of the pores during the conversion of the liquid film-forming solution to the solid film.

Commonly used reinforcing materials generally available to the plastics industry are not well suited for reinforcing microporous filter films because of the disruptive effects described above. The present invention is based on the discovery that certain mesh fabric structures may be embedded within microporous filter films to impart additional strength without substantial impairment of the filtering characteristics of the film.

In this invention reinforcement of the microporous plastic film is provided by embedding in it an open mesh fabric web formed of smooth surfaced strands of diameter less than about 250$\mu$, and having mesh openings smaller than about 1.0 millimeter. When used as a reinforcing web, this material does not disrupt either the porosity of the filter or the orientation of the pores; does not increase the thickness or bulk of the structure to render it stiff or brittle nor otherwise materially reduce its permeability; and does not disrupt its surface so as to impair its very important filter function. It is, moreover, highly permeable while providing adequate support to the filter film both during its formation from the liquid state and during filtering operations.

In addition to being an ideal reinforcing material, the open mesh fabric web embedded in a microporous plastic film provides a structure having not only increased tensile strength but also increased flexibility such that it may be creased or turned in a manner which would cause the unsupported film to crack. This unexpectedly high degree of flexibility is believed to accrue from a localizing of the major amount of bending to the areas where the film covers a fiber and is thinner and more flexible.

By forming the filter with the fabric embedded within the microporous plastic filter film, the permeability of the combination is reduced by not substantially more than in proportion to the amount by which the total filtration area is reduced. Friction losses which would be present if the liquid were passed directly through the reinforcing web are largely eliminated, since the fluid being filtered does not come in substantial contact with the reinforcing web. In this connection it is of course most desirable that the web have as high an open area relative to its total area as possible. Preferably the open area of the web should be at least about 50% of the total web area so that at least about half, and preferably much more, of the area of filter film be available for filtration.

Particularly suitable reinforcing materials are woven open mesh fabrics of strands comprising monofilament synthetic fibers, such as nylon, and glass. Such strands are smooth surfaced and strong and may be formed extremely thin. They may accordingly be completely embedded within the film without causing it to be unduly thick and without seriously disrupting its surface characteristics. Accordingly, a filter film embedding an open mesh web of strands of fine monofilament fibers may be of substantially the same dimensions and surface characteristics as a microporous plastic film formed without reinforcement, but will be much stronger and of increased flexibility.

In the regions of a strand, a slight ridge may be present when a film of minimum thickness is formed. This ridge may however be eliminated by forming the film slightly thicker. In any case the filter film becomes thinner in these regions because of the volume occupied by the strand. Since however filtration cannot occur in these regions because of blockage by the strands, there is no danger of large openings forming through the film. Moreover, these regions of reduced thickness are believed to account for the increased flexibility of the filter material of this invention.

A further advantageous effect realized by combining a fine open mesh reinforcing web with the microporous plastic film is a bonding of the filaments forming the web where the individual strands across one another. As a result the filter film actually increases the strength of the web.

The manufacture of the reinforced filter film of this invention consists in applying the liquid film forming material, typically a solution of film-forming material in solvents as described in any of the above-cited references, to the fabric web to form a liquid film which completely coats the fabric and spans the openings of the mesh. The fabric with the adhering film is then passed through suitable treating chambers where the liquid film is processed to solid form, in the usual manner.

The presently preferred embodiment of this invention is described in detail below. Reference is made to the accompanying drawings in which:

Fig. 5 is a schematic elevation in section showing one preferred manner of forming a filter film of this invention.

Figure 1:
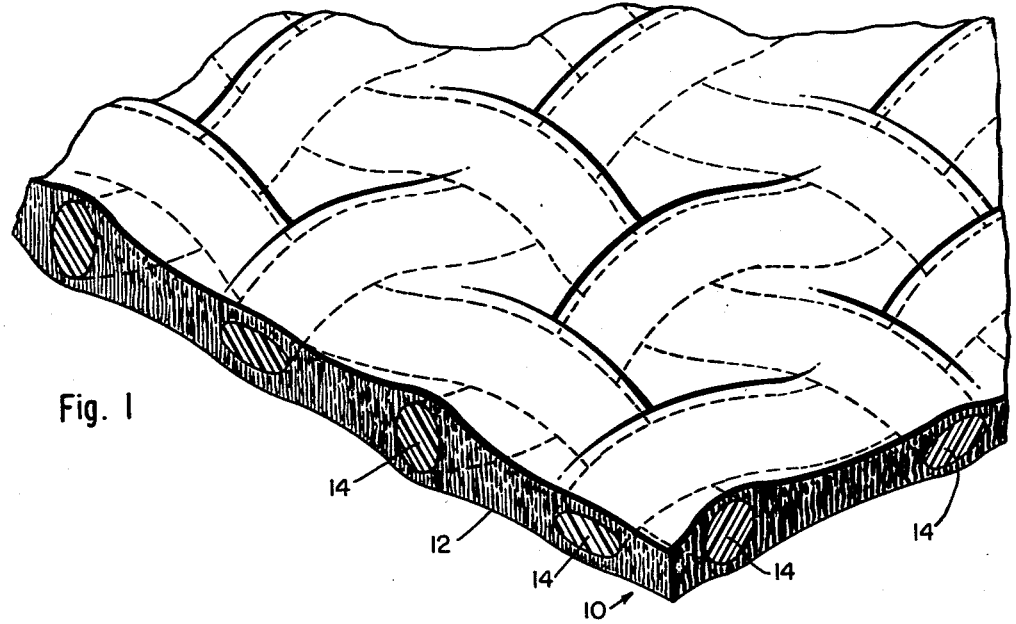
Fig. 1 is an enlarged view partly in section showing a filter film embedding a reinforcing web in accordance with this invention.

As shown in Fig. 1, the reinforced filter medium 10 of this invention consists essentially of a sheet of microporous plastic filter film 12 in which is embedded a reinforcing web of an open mesh fabric 14 formed of interwoven smooth-surfaced strands. The fabric 14 is preferably completely enclosed within the body of the filter film such that only filter material is presented at the exposed surfaces.

The thickness of the reinforced medium 10 is to a large extent controlled by the dimensions of the fabric 14, the minimum thickness attainable being about the same as or slightly less than the diameter of the strands, since the film surfaces tend to bow inwardly in the area between strands. It is accordingly important that the fibers be not substantially more than 250μ in diameter, and preferably they are much less, e.g. 30μ, and are well embedded within the film and least disruptive of the exposed surface.

The mesh openings must be sufficiently small that the fabric provides support for the film 12 during its normal use in the areas spanning the openings. The mesh openings must also be ordinarily sufficiently small that support is provided during processing when the cast plastic film-forming solution is converted to the solid form, unless a casting surface or the like is provided to support the liquid film during its solidification.

Under ordinary filtration conditions proper support for the film spanning the openings is generally obtained if the openings are less than about 1.0 millimeters, but support of the liquid film during its processing to the solid form requires smaller openings, of less than about .5 millimeters.

The fabric may well be of much finer mesh, particularly when of smaller strands, so long as its total open area is not so reduced as to impair the permeability of the filter film. The individual strands forming the mesh fabric are shown in this illustrative embodiment as being single monofilament fibers, and this form is preferred because it presents optimum surface smoothness and compactness for a given fiber cross-sectional area. However smooth surfaced strands comprising multiple monofilaments and having the requisite diameter may also be used to form the mesh fabric reinforcing web.

Figure 2:
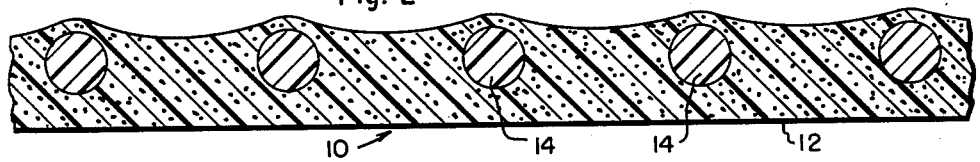
Fig. 2 is a cross-sectional view of a reinforced filter film formed to have a smooth flat surface.

In Fig. 2 is illustrated a reinforced filter medium having a smooth flat lower surface particularly well adapted for filtration where the filter is to be cleaned of collected solid matter and then reused, e.g. as in continuous filtration. A flat filter surface of this type may be provided by applying a slight excess of the plastic film-forming solution to the fabric web such that one side of the fabric is covered with a film of solution sufficiently thick to present a smooth surface either under its own surface tension or under the action of a flat casting surface.

Figure 3:
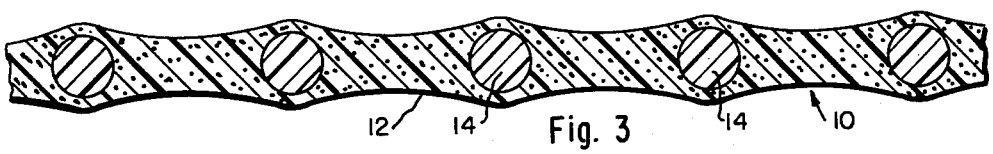
Fig. 3 is a cross-sectional view of a reinforced filter film formed to be of maximum permeability.

A filter 10 formed of a thinner film 14, in which both surfaces show the pattern of the fabric 12 is shown in Fig. 3. A material of this type, utilizing a minimum of filter film-forming material, and being of minimum thickness is preferred where extremely high permeability and flexibility are desired.

Figure 4:
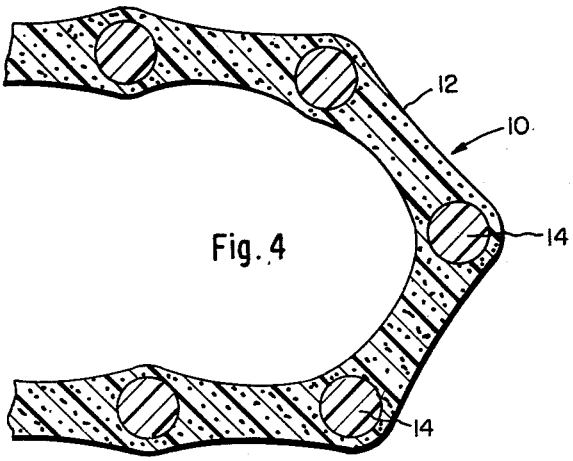
Fig. 4 is a cross-sectional view showing a filter film bent in a sharp fold to illustrate the articulated effect achieved in this invention.

The advantageous effect of increased flexibility provided by incorporation of the open mesh web 12 into the filter film is shown by Fig. 4. The strands of the web impart an articulated effect, by serving to localize the bending to the regions surrounding the filaments or strands and where the film itself is the thinnest. As a result a far sharper bend may be made with the reinforced film than may be made with an unreinforced film of the same thickness, and the presence of the mesh web also makes the film more pliable. The limitation imposed on an unsupported microporous filter film by its stiffness and ease of cracking is largely avoided in the reinforced structures of this invention quite indlependently of the increased strength imparted by the reinforcing web.

The preferred method of forming the reinforced filter film of this invention is shown in Fig. 5. The fabric 14 is led from a feed roll 20 into a reservoir 22 of the plastic film-forming material where it is submerged by passing under a dunking roller 24. From the reservoir 22 the impregnated fabric is passed over an upwardly inclined smooth surfaced plate 26. In passing over the plate 26 a uniform thin film of solution is formed on the fabric 14 while excess solution drains back to the reservoir 22. The film is then further processed, while carried by the fabric, in the conventional manner of forming a microporous filter film. In a preferred embodiment the film is formed from a solution of cellulose nitrate and/or cellulose acetate dissolved in a volatile solvent, such as described by Zsigmondy, and the fabric and impregnating liquid film are passed through a humidifier chamber 27 and then a drying chamber 28 where the film is processed in the well known manner. During humidification and drying the liquid film is converted to a solid microporous structure carried by the fabric, which may then be accumulated on a take-up roll 30 and prepared for ultimate use or sale. As pointed out by Zsigmondy, a filter film of this type may be capable of retaining particles as small as 1/10,000 millimeter, which corresponds to an effective pore size of about 100 millimicrons.

Although the invention is described above with specific reference to the cellulose ester films of the type described by Zsigmondy, other solutions of film-forming materials and treatments for processing them into microporous solid structures, as well known in the art, may be used with entirely satisfactory results.

The fabric 14 may be any of several commercially available materials of the characteristics required of this fabric, such as that sold by the National Filter Media Corporation, designated MN 1661, a 200 mesh nylon cross weave fabric of monofilament diameter 30µ and mesh openings of .0033 inch (0.08 millimeter). In forming the filter film around the fabric as described above, the viscosity and concentration of the film-forming solution may be varied in known manner to control the thickness of the liquid coating and the characteristics of the filter film. In addition, the amount of film-forming material carried by the fabric may be controlled to a large degree by adjusting the slope of the inclined plate 26. As suggested by the drawing, the web 14 in travelling from the reservoir 22 upwardly over the plate 26 carries with it an excess of film-forming solution both between the web and the plate and on the outer surface of the web. Where the plate 26 is steeply inclined, a lesser amount of solution is carried by the fabric web 14 whereas greater amounts are carried when the plate is inclined less steeply. Accordingly in producing a product of greater than minimal thickness, e.g. as suggested by Fig. 2, the plate is adjusted at a relatively shallow slope. The excess solution carried then flows to the lower side of the fabric after it leaves the upper edge of the plate, and there assumes a smooth surface which is retained during subsequent processing. Where a thinner film is desired, such as suggested by Fig. 3, the plate 26 is adjusted to a steeper inclination. The adjustment of the plate 26 to a proper angle is in accordance with the desired thickness of the deposited coating, and is a matter within the skill of those in the coating art.

Having thus disclosed my invention and described in detail its preferred embodiments, I claim and desire to secure by Letters Patent:

1. A physically strong and flexible filter sheet capable of removing particles of bacterial size comprising in combination a thin flexible microporous plastic film sufficiently permeable for filtration and having substantially transverse pores of effective diameter between 100 millimicrons and 1 micron which in number occupy a total volume in excess of 80 percent of said film and render it inherently fragile and brittle, and a web embedded in and substantially completely surrounded by said film, said web being an open mesh fabric formed of smooth surfaced nylon strands of non-absorbent monofilament fibers which are completely within and covered by said film such that the filter surface is not disrupted by said strands, said strands having a strand diameter less than about 250 microns and forming between them openings of less than about 1 mm. but of sufficient size that the permeability of the sheet is sufficient for filtration, the volume within said openings being completely occupied by said filter film and the area of said openings being of sufficient size that filtration occurs solely by the action of said film and said film being of reduced thickness in the region of said strands.

2. A physically strong and flexible filter sheet comprising in combination a thin flexible microporous plastic film sufficiently permeable for filtration and having substantially transverse pores of effective diameter between 100 millimicrons and 5 microns which in number occupy a total volume in excess of 80 percent of said film and render it inherently fragile and brittle, and a web embedded in and completely surrounded by said film, said web being an open mesh fabric formed of smooth surfaced strands of non-absorbent monofilament fibers which are completely within and covered by said film such that the filter surface of said film is not disrupted by said strands, said strands having a strand diameter of less than 250 microns and forming between them mesh openings of less than about 1 mm. but of sufficient size that the permeability of the sheet is sufficient for filtration, the volume within said openings being completely occupied by said film and the area of said openings being of sufficient size that filtration occurs solely by the action of said film, said film being of reduced thickness in the regions of said strands.

3. A physically strong and flexible filter sheet comprising in combination a thin flexible microporous plastic film sufficiently permeable for filtration and having substantially transverse pores of effective diameter between 100 millimicrons and 5 microns which in number occupy a total volume in excess of 80 percent of said film and render it inherently fragile and brittle, and a web embedded in and substantially completely surrounded by said film, said web being an open mesh fabric formed of smooth surface strands of non-absorbent monofilament nylon fibers which are completely in and covered by said film such that the filter surface of said film is not disrupted by said strands, said strands having a strand diameter of about 30 microns and forming between them mesh openings of between about 0.08 mm. and 0.5 mm., the volume within said openings being completely occupied by said film such that filtration occurs solely by the action of said film, said film being of reduced thickness in the regions of said strands.

References Cited in the file of this patent

UNITED STATES PATENTS

| | | |
|---|---|---|
| 1,421,341 | Zsigmondy | June 27, 1922 |
| 1,693,890 | Duclaux | Dec. 4, 1928 |
| 2,197,805 | Lovett | Apr. 23, 1940 |
| 2,407,632 | Dreyfus | Sept. 17, 1946 |
| 2,539,301 | Foster | Jan. 23, 1951 |
| 2,563,644 | Drisch | Aug. 7, 1951 |
| 2,573,639 | Coler | Oct. 31, 1951 |
| 2,771,659 | Ball | Nov. 27, 1956 |
| 2,783,894 | Lovell | Mar. 5, 1957 |